Inventor
Francis T. Spencer
by Roberts Cushman & Grover
Attys

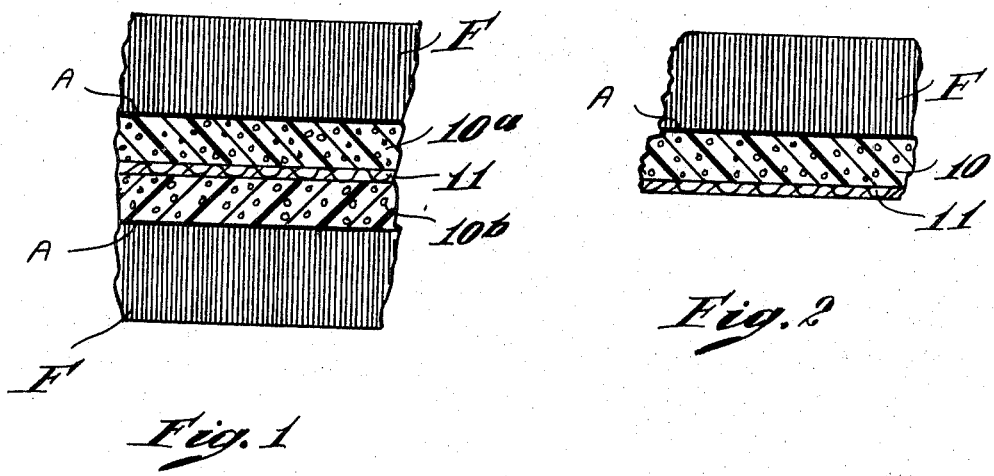
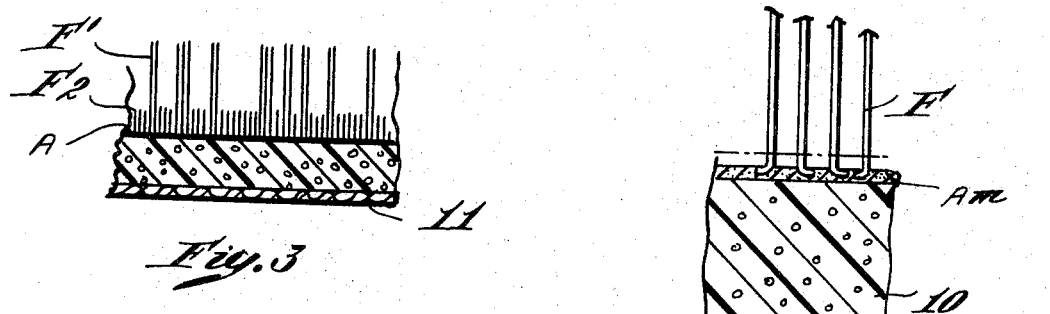
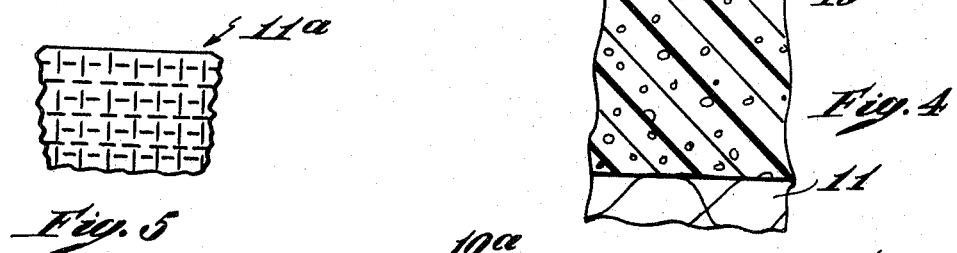

Sept. 15, 1970          F. T. SPENCER          3,528,874

HEAT-INSULATING FABRIC AND METHOD OF PREPARING IT

Filed Jan. 13, 1969          3 Sheets-Sheet 3

INVENTOR.
Francis T. Spencer
BY
Roberts Cushman & Grover
ATTORNEYS

United States Patent Office 3,528,874
Patented Sept. 15, 1970

3,528,874
HEAT-INSULATING FABRIC AND METHOD OF PREPARING IT
Francis T. Spencer, Biddeford, Maine, assignor to West Point-Pepperell, Inc., West Point, Ga., a corporation of Georgia
Continuation-in-part of application Ser. No. 494,691, Oct. 11, 1965. This application Jan. 13, 1969, Ser. No. 824,326
Int. Cl. B44c 1/08
U.S. Cl. 161—63
20 Claims

ABSTRACT OF THE DISCLOSURE

Lamellar material acceptable for use as a bed blanket and comprising a reinforcing ply of textile fabric having from 75% to 97% voids and to one face, at least, of which there is bonded commercial, closed-cell, polyurethane foam sheeting of a thickness of the order of $\frac{3}{32}$ of an inch, the major portion, at least, of the exposed face of any such foam ply being concealed by a level layer of adherent flock fibers, and a method of making such material.

In a preferred embodiment, the major portion of the flock fibers composing said layer are of substantially uniform length and closely spaced so as to conceal the reinforce fabric while the remaining flock fibers, of a greater length but also substantially uniform in length, are less closely spaced but likewise distributed uniformly over the entire area of the foam ply. In another embodiment, an ornamental pattern is formed by areas substantially devoid of flock fibers, at which the surface color of the foam ply is visible, imparting the suggestion of embossing. In another embodiment, the adhesive layer is discontinuous, thereby lessening stiffness. According to another desirable procedure, the cured material comprises a substance which permanently softens it.

The present invention is a continuation-in-part of abandoned copending application of Francis T. Spencer, Ser. No. 494,691, filed Oct. 11, 1965.

BACKGROUND OF THE INVENTION

In general, the application of flock to a base fabric to provide a suede-like finish is well known and apparatus for applying short flock fibers to a base fabric is commercially obtainable. Commonly, such apparatus comprises a support or table over which the base fabric is drawn, the base fabric having been so treated that its upper face is adhesive for retention of the flock fibers. Above this table or support there is a receptacle for flock fibers, the receptacle having slots or other openings through which the flock fibers may fall, and within the receptacle there is usually an elongate rotating screw, or similar device, which agitates the flock fibers and sweeps them across the openings through which the flock fibers drop down onto the adhesive surface of the base fabric. Beneath the base fabric so-called "beaters" are located which set up rapid vibrations in the base fabric such as to assist in causing the fibers to assume an upright position as they approach the adhesive. As a further means for assuring the upright position of the flock fibers, it has been common to provide the machine with an electrical device which creates a high tension electrostatic field through which the fibers pass in approaching the adhesively-coated base fabric, thus tending to cause the fibers to separate and become parallel and perpendicular. The latter arrangement is disclosed in the patent to Spencer No. 3,379,175, dated Apr. 28, 1968.

In accordance with the present invention, apparatus fundamentally similar to customary flocking mechanism such as that above referred to is employed but so modified that, unlike most prior apparatus, it distributes fibers from the reservoir in such quantity per unit of time as to provide a flock of predetermined density, and arranges the flock so delivered in accurate uniform distribution over the surface of a base material which may be of a width sufficient to form a blanket of maximum width, such an apparatus being more fully disclosed in the copending application of Francis T. Spencer, Ser. No. 565,-235, filed July 14, 1966.

It has heretofore also been suggested that a composite substrate comprising textile material and a layer of "reticulated" plastic foam be provided as a base for the attachment of flock fibers; reasons given for the use of reticulated foam being based on the theory that because throughout the open cells of the reticulated foam, the end of a flock fiber will drop down onto an open cell and as liquid adhesive will also enter the open cell, an appreciable length of the flock fiber will be embedded in the adhesive and firmly anchored to the base fabric. However, it should be remembered that the cost of flock fibers rapidly increases with increased length. If a substantial fraction of the length of the customary very short fibers were thus sunken in the base material, the resultant flock layer would be undesirably thin, and it would be necessary to use flock fibers of a substantially greater length than would otherwise be required in order to provide the desired depth of nap, thus increasing the cost for the flock material. Furthermore, the setting of adhesive within the deep open cells of the foam would add very substantially to the stiffness of the material and thus decrease its value for the purpose intended.

In the manufacture of flocked fabric such, for example, as carpeting, it is usual to employ fibers of, for instance, 40 denier and to arrange them very closely so as to make a very firm, dense, stiff, wear-resistant material. On the contrary, in accordance with the present invention, and to assure the desired softness and drapeability, the flock fibers are desirably from 3 to 8 denier and of a length of from 2 to 6 mm., and are arranged much less densely than is customary in carpet fabric. Merely by way of example, the weight of flock fibers per square yard of a good grade of the blanket material of the present invention may be within the range of from 0.075 oz. to 4.0 oz.

SUMMARY

This invention pertains to heat-insulating material and a method of making it, the material being of that type which comprises a flexible base, substrate or body fabric, one face at least of which is concealed or partially concealed by a layer of upstanding flock fibers, said flock layer not only functioning as a heat insulation but also being pleasing to the eye and imparting a pleasant softness to the touch. In accordance with the present invention, the major portion of the base, substrate or body fabric is a closed-cell plastic foam, thus substantially contributing to the heat-insulating properties of the material, and the adhesive employed, in bonding the flock fibers to the closed-cell foam ply, is a compound which provides a bond such that the completed material withstands laundering and rough handling without shedding nap and also resists change in color when the material is exposed to ultraviolet light.

By variation in the length of the individual flock fibers constituting said fibrous or nap layer, the material may be adapted to a wide variety of uses, for example, for the manufacture of bed blankets of many grades; as a substitute for natural fur; or even as drapery material, or for use in making children's sleeping garments.

As already noted, the base fabric employed, in accordance with the present invention (FIG. 2) comprises closed-cell polyurethane foam, this material being cheap as compared with "reticulated" foam and having been found to have the requisite physical and chemical characteristics, whereas certain other plastic foams, for instance the vinyl foams, are undesirably stiff, especially when coated with adhesive.

With respect to the suggested utility of the material as a bed blanket, it is obvious that to make it acceptable for such use it must possess those characteristics which are customarily expected in such a blanket, to wit, not only must it provide the desired warmth but it must be soft and drapeable; durable under conditions of use, in particular, laundering or dry cleaning; it must be light in weight and, desirably, pleasing in appearance and feel, that is to say, it must be of a "soft hand"; it must not readily shed its nap fibers when exposed to handling or abusive treatment; it should not change color when exposed in a shop window; and the saving in labor cost as compared with that involved in the manufacture of bed blankets by customary methods need not be nullified by the employment of unduly costly materials.

The present invention provides material, in particular bed blanket material, which, with respect to durability, exceeds or at least equals that of customary woven blanket material; it is comparable in warmth and softness to that made by prior methods; it provides a blanket material which, with respect to pleasing appearance, may be made to exceed any known blanket material heretofore available; it provides a blanket material which is lighter in weight and softer to the touch than any previous blanket material having equal heat-insulating properties; it provides a blanket material which may be produced at a labor cost which is no greater than that involved in the manufacture of a woven blanket and it provides a blanket material having a napped surface which will not unduly change color when exposed to ultraviolet light.

While the material has been referred to as "blanket material" it is contemplated, as above noted, that it may be made so thin and drapeable that it may be used, for example, in the manufacture of sleeping garments. Thus, for example, only one ply of foam may be provided, the reinforce fabric then being visible at one side of the fabric. In this instance it is obvious that the reinforce material or webbing should be of sufficiently small mesh to afford good anchorage for sewing stitches. When provided with ornamental patterns in contrasting colors, it makes a very acceptable drapery, as above suggested, or constitutes a desirable upholstery fabric.

As a further modification, by the use of long flock fibers, the fabric may be made to resemble natural fur.

While it is possible to apply flock fibers of different colors to form ornamental patterns, such a procedure would be complicated and expensive. For that reason, in accordance with the present invention, it is suggested that any desired color effects may be obtained by coloring or printing the foam or by the use of a colored adhesive.

Before the flock is applied, the basic material may be treated as hereinafter described, to make it permanently soft. After the flock has been applied as above described, the material is cured so as to set the adhesive, for example, by passing it through an oven heated to the proper temperature; the napped surface may be brushed to remove unattached fibers, and softened to neutralize stiffening resultant from curing, for example, by a treatment hereinafter described.

Material embodying the present invention and certain desirable steps in its production are illustrated in the accompanying drawings wherein:

FIG. 1 is a fragmentary diagrammatic vertical section, to large scale, illustrative of one embodiment of the present invention;

FIG. 2 is a view similar to FIG. 1, but showing an alternative construction;

FIG. 3 is a view similar to FIG. 2, but showing a further and preferred construction;

FIG. 4 is a fragmentary view, to very large scale, diagrammatic in character, suggesting an effect sometimes obtained when certain adhesives are employed in the manufacture of the material of the present invention;

FIGS. 5 and 6 are diagrammatic plan views illustrative of types of reinforce material which may be used;

FIGS. 7 and 8 are fragmentary plan views illustrating one way of decorating the material;

Figure 9:
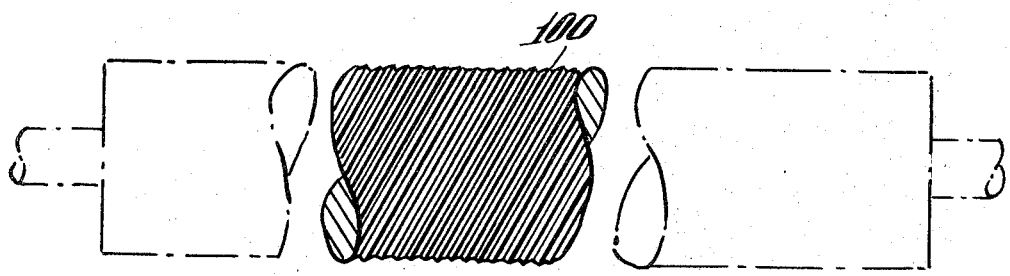
FIG. 9 is a fragmentary elevation illustrating a roll useful in applying adhesive to the foam ply according to a preferred method.
Figure 14:
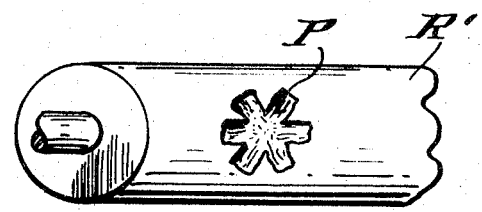
Figure 12:
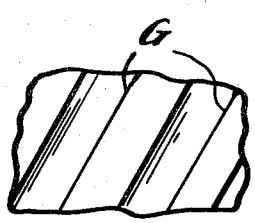
FIG. 12 is a fragmentary large scale plan view of the roll of FIG. 9 showing the channels.
Figure 15:
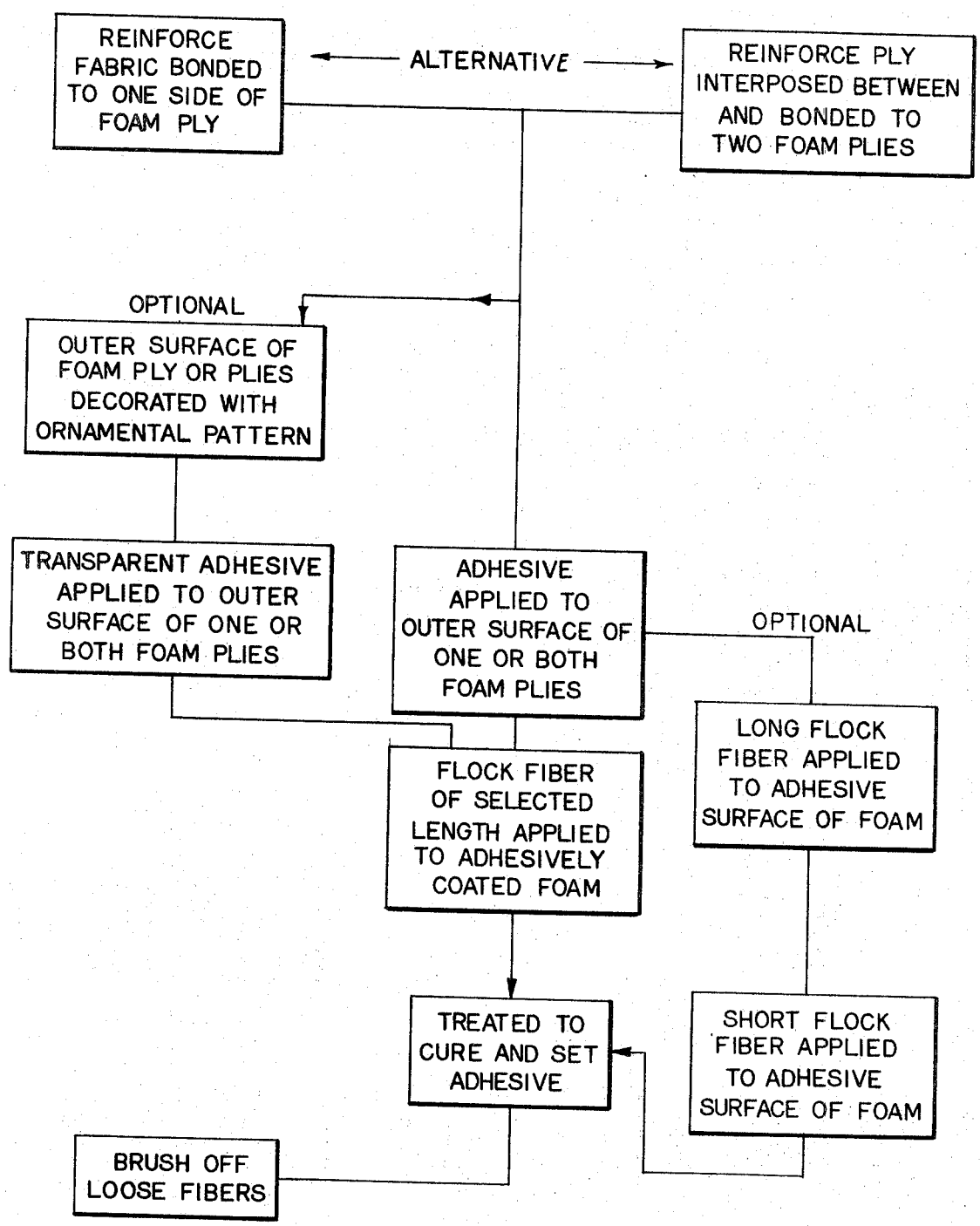

FIG. 14 is a fragmentary perspective view illustrating a modification of the adhesive-applying roll of FIG. 9 (useful in the apparatus of FIG. 11 in substitution for the roll 9), illustrating how the fabric may be ornamented to give it the appearance of having been embossed; and FIG. 15 is a flow sheet indicating certain desirable sequences of steps which may be employed in the process of making the improved material of the present invention.

Briefly stated and without at this point elaborating upon the details of the procedure whereby the material is prepared, the material which finally evolved as the result of experimentation consists, in a preferred form (FIG. 1) of two plies or layers of a closed-cell plastic foam (preferably polyurethane) with a ply of a tough, strong, open-mesh reinforcing material interposed between and bonded to said layers, and a layer of flock fibers adhesively bonded to the exposed face of one or both, respectively, of said foam plies.

In accordance with the present invention, an acceptable blanket material, wherein the flock layer consists of very short fibers (as compared with those usually resultant from the napping of a woven base fabric), that is to say, fibers such as are commonly referred to as "flock fibers" and preferably those within a range of from 2 to 6 mm. in length, is made practicable by employing, as a base fabric, one which itself is a very good heat insulator, for example, a synthetic plastic foam, and more especially ordinary closed-cell commercial polyurethane foam which is preferable, not only because of its lower cost (approximately 50%) as compared with the open-celled, so-called "reticulated plastic foam" but also because, unlike the open cell foam, the adhesive employed, in bonding the flock fibers to the closed-cell foam ply, does not penetrate to any substantial depth into the closed-cell foam and thus does not stiffen the foam ply to any such extent as results when the open-celled foam is employed. Not only is this closed-cell foam a good heat-insulator, but it is soft, limp and drapeable so that the resultant blanket material has the basic qualifications, as to heat insulation and drapeability, demanded of acceptable blanket material.

In contrast with reticulated polyurethane foam, the surface of the closed-cell foam, as seen under the microscope, exhibits a multitude of shallow "pock-marks," but very few open cells. Thus, if the adhesive be applied to the closed-cell foam material, for example, by spraying, there would be no appreciable penetration of the adhesive into the foam and that portion of a flock fiber, devoted to anchoring it to the substrate, would not substantially exceed the maximum thickness of the adhesive layer. By the employment of a suitable adhesive such, for example, as hereinafter more fully set forth, it is possible to anchor the flock fibers adequately and permanently to the closed-cell foam. However, even though the layer of adhesive for anchoring the flock fibers be of but small depth, this layer of cured adhesive, as usually applied, does form a continuous skin adherent to the surface of the foam and thus does have an appreciable effect in stiffening the material. To avoid even this slight stiffening, and in accordance with a preferred embodiment of the present invention, this stiffening effect is overcome, as hereinafter more fully described, by so applying the adhesive as to form a discontinuous skin or layer whose discontinuity appreciably adds to the flexibility of the completed material. Careful experiment has shown that this procedure does not retract from the surface appearance of the flock layer nor appreciably reduce the insulating characteristics of the material.

Polyurethane foam is of low tensile strength and easily torn and therefore, in accordance with the present invention, a strong and tough foundation, substrate or reinforce fabric is associated with the foam ply, preferably, as illustrated in FIG. 1, with the foundation ply 11 interposed between two layers 10a, 10b of foam. This foundation or reinforce ply 11 may consist of or comprise independent spaced textile threads, or of textile yarns or threads concatenated according to any well-known textile procedure to form a coherent fabric, for instance a woven fabric (FIG. 5), but in any event, such foundation ply should be of very open-mesh to avoid undue weight. Merely by way of example of a suitable foundation fabric, cotton scrim of an open-mesh providing from 90% to 97% voids has proven satisfactory. However, a webbing having a lesser percentage of voids may be employed with reasonably good results, for example 75% voids, particularly if the constituent yarns be very fine and strong as, for example, silk. Desirably, this foundation material should have a minimum tensile strength of approximately 20 pounds per inch, both longitudinally and transversely and weigh from approximately 6.4 to 10.0 ounces per square yard.

A recommended thickness of the polyurethane foam ply 10a, 10b is $\frac{1}{16}$ inch or more and if two plies 10a, 10b are employed (FIG. 1) they may, if desired, be of the same thickness or on the other hand the two plies may be of different thicknesses; for example, one may be $\frac{1}{16}$ of an inch in thickness and the other $\frac{3}{32}$ of an inch thus providing an aggregate foam thickness of $\frac{5}{32}$ of an inch.

Having prepared the foam plies and the reinforcing web, these parts may be brought into assembled relation in any desired way and laminated together by a conventional water insoluble adhesive, although it is contemplated that conventional flame bonding might be used. As hereinafter more fully described, this laminate may be treated, at this point, to make it permanently soft.

The flock fibers F (FIG. 1) may be of any desired material, preferably such as are not readily absorbent of water, as, for example, silk, or one of the synthetic plastic substitutes for wool, but when cost is a controlling factor a relatively cheap cellulosic flock such as cotton or rayon may be used. However, since cellulosic flock materials are highly water-absorbent, lose strength when wet, and, during laundering treatment, by contact with parts of the laundering apparatus, may be permanently crushed or bruised, it is desirable, when employing such fibers, to pretreat them with a water repellant, such as one of those which are commonly used to make garments rainproof. Material commercially known as Nalon RD, a product of Du Pont Company, fortified with Aerotex "Resin 23" (a resin binder), gives good results, as is also true of Zapel, another Du Pont Company product. Another rainproofing material commercially sold as "Ranedare P.F." manufactured by Metro-Atlantic, Inc. of Centredale, R.I. is suggested, it being understood that this material does not dissolve out in laundering. It may also be treated, if desired, with a suitable flame-retarding reagent.

It is desirable to employ flock fibers of uniform length rather than heterogeneous in length (as is true of the cheaper grades of flock) in order to obtain a flock layer which is substantially level, but because the cost of such flock, of the best grade, is quite substantial, for example, two or three times that of the raw fibrous material from which the flock is made, it is contemplated, as within the purview of the present invention, that in making a good grade blanket fabric without undue cost, two lengths of flock may be employed, one, a relatively long fiber $F^1$ (FIG. 3), for instance, 3 mm. in length; first uniformly distributing these long fibers relatively sparsely over the entire area of the adhesively-coated plastic ply (said long fibers $F^1$ collectively imparting an attractive, nap-like appearance to the blanket) and then adding flock fibers $F^2$ of a shorter length, which are cheaper than the longer fibers $F^1$, these shorter fibers being closely distributed over the entire area so as to fill in the spaces between the long fibers, these shorter flock fibers $F^2$ being, for example, of the order of $\frac{3}{4}$ mm. in length. These shorter flock fibers not only mask the plastic ply but also contribute in substantial degree to the heat-insulating character of the material.

Merely by way of example, the ratio of short and long fibers per square inch of material may be 75% short and 25% long, and the total weight of flock fibers, in ounces per square yard of the material, being within a range of from 0.075 to 4.0. However, when the cost is not a controlling factor, it is preferable, as above noted, to use flock fibers of a single uniform length.

Preparatory to the application of the flock fibers, the exposed surface of the foam ply or plies will be coated with adhesive A (FIGS. 1 and 2).

In the course of experiment and extended tests of material made during the early stages in the development of the invention here claimed, it was noted that when the material was exposed to ultraviolet light (as in a display window) and/or to elevated temperatures (such as are involved in curing the flock-bonding adhesive), it changed in color, in particular, the foam ply became of an undesirable yellow shade. It was also observed that the adhesives which were initially employed for bonding the flock fibers to the foam, transmitted ultraviolet light to the foam layer, although the adhesive itself was not chemically changed or discolored. In seeking for the cause of this discoloration it was recalled that the manufacturers of acrylic polymer adhesives customarily recommend, to the user, the addition of acid salt-complex or metallic salt-complex catalysts as helpful in reducing the time required for curing the adhesive and that this recommendation had been followed in preparing the adhesives used during experimental work for bonding the flock fibers to the foam ply. Tests showed that if such a modified adhesive were exposed to temperatures above 275° F. or to ultraviolet radiation, the salt-complex catalysts would break down with an intermolecular reaction and reduction of the melt temperature and that when the blanket comprised such a catalyst, the yellowing of the polyurethane foam was very pronounced; whereas if the catalysts were omitted from the adhesive but little discoloration occurred.

As to the recommended adhesive employed for bonding the flock fibers to the foam, it should be noted that it is not sufficient, in attempting to produce a non-shedding material, merely to create an initially strong bond between flock and foam, but the bond must withstand repeated and severe laundering; it must be able to withstand dry cleaning; it must not be affected adversely by exposure either to heat or cold; it must not be so stiff when cured that it renders the fabric boardy; it must be capable of firmly entrapping a suspended dye stuff employed to impart color to the fabric; and it must not discolor either or itself or through some chemical action such as may be produced by exposure to high temperature or ultraviolet light.

An ideal adhesive for the purpose should, as shown by extended experiment, be free of acid salt-complex or metallic salt-complex catalysts; desirably, it should have a viscosity of the order of 15±m.c.p.s., and a pH value of from 7.5 to 8.5; it should include some material, for example, a thermosetting resin, to provide bonding strength; it should produce, when cured, a colorless transparent film, and include an ultraviolet absorber thereby to protect the foam ply from the action of ultraviolet light, and preferably it should comprise a defoamer.

As a basic adhesive, modified as hereinafter described, so as to have the above physical characteristics, one was selected (after many others had ben tried) from the acrylic latex family group and, in particular, the self-cross-linking acrylic emulsion sold by Rohm & Haas under the trade name "Rhoplex Emulsion E–32". Rhoplex emulsions are described by Zimmerman and Levine in Supplement III in the 1953 edition of Handbook of Material Trade Names as follows:

"A group of aqueous dispersions of acrylic polymers. They are white, opaque liquids that produce colorless transparent films that possess excellent permanence properties, durability, adhesion, pigment-binding capacity." . . . They are "useful for bonding textile fibers."

This E–32 material, as supplied to the user, is an opaque liquid producing a colorless transparent film; it is substantially free of salt-complex catalysts; and is understood to have, inter alia, the following physical characteristics, viscosity at 25° C. 200 c.p.s.; solids content 46%; pH value 3.2; density at 25° C.—8.8 lbs. per gal.; film break-elongation load 620 lbs./sq. in.; and film hardness (A scale) 32 Shore.

For the purpose of the present invention this particular adhesive (E–32), as compared with many other adhesives, has been found to provide the best base with which to combine other materials in providing an adhesive having the very special characteristics desired in the successful practice of the present invention. It will, of course, be understood that, in minor particulars, this base may vary to some extent as, for example, by reasons of the use of materials which may not in all cases be chemically pure, but, in general, an aqueous dispersion of acrylic polymers, having physical characteristics substantially as above set forth, may be expected to function in substantially the same manner. Such adhesive will thus hereinafter be referred to as the "basic adhesive." This basic adhesive is modified, in accordance with the present invention, to produce an adhesive of such viscosity that it may be spread evenly over the surface of the foam ply; will not penetrate deeply into the foam ply but will still be sufficiently tacky to insure the adhesion of the flock fibers on contact, by adding to the basic adhesive E–32 (which contains only 46% solids), approximately 1 to 5 parts, based on the solids content of the acrylic latex, of a thickener. It was found by experiment that by adding 1.2% of either a polyacrylate or cellulosic thickener it was possible to obtain a product having a viscosity of the order of 15±m.c.p.s. However, pH adjustment to 7.5 to 8.5 with 0.5% by weight ammonium hydroxide was found to be necessary when using the polyacrylate type of thickener. In order to secure the desired bonding strength it was found experimentally that incorporation of either a melamine formaldehyde condensate or urea formaldehyde condensate (both of which are thermosetting resins) in a concentration of from 1.2 to 4.8% by weight, on the basic adhesive, increased the bonding strength and enormously contributed to the durability of the final product. The melamine and urea formaldehyde resins undergo polymerization and react with the acrylic latex in producing a very strong bond. An ultraviolet absorber (for example, benzotriazole) more specifically, from 0.2% to 1.0% of 2(2'hydroxy-5'-methylphenyl) benzotriazole, and having an absorbability of between 290 anad 400 millimicrons and which is stable as to degradation by ultraviolet radiation in the amount of 0.6% by weight was also added, and as a defoamer 0.27% of Nopco DF–1609 is added. Thermostability to washing and dry cleaning are thus achieved and a decrease in ultraviolet damage. The resultant modified basic adhesive has all the characteristics which are required in the production of material according to the present invention.

While that particular acrylic latex identifier as above as E–32, when modified, has been found to give the desired results, it is to be understood that the invention is not necessarily limited to the use of this particular acrylic emulsion, as it is contemplated that other members of the acrylic latex family group, having physical characteristics generally similar to that of Rhoplex Emulsion E–32, may be used as the basic adhesive which, by modification, substantially as here described, will provide the physical characteristics above noted as desirable in an adhesive employed in the practice of the present invention.

As to the amount of the above or equivalent adhesive employed in bonding the flock to the plastic layer, it has been found that the amount of adhesive per square yard may vary from 0.9 to 1.5 ounces and the thickness of the adhesive coating from 0.015 to 0.255 inch in the wet state. There is a direct relationship between the amount of flock fiber which can be attached and the amount of adhesive used. Since it is contemplated that the practice of the invention may be such as to provide a rather broad range of flock lengths and quality, the amount of adhesive and the thickness of the coating may well vary within the ranges above described, and it will be understood that the above suggested range of weight and thickness of the adhesive coating may be extended under certain conditions especially with reference to the type of fiber employed.

In applying the flock fiber to the plastic layer, it is preferable to deliver the flock at a slightly greater rate than is necessary to produce the desired density, and then to collect those flock fibers which do not adhere to the foam ply, and return them to the reservoir from which the flock is fed, thus insuring the desired density but without waste of material.

It has been found experimentally that if the reinforcing webbing or net be made of yarn which is glossy, so that it readily reflects light, the webbing will show through the completed material. Thus it is desirable to use a dull yarn (delustered), to wit, one which has a low index of reflection, that is, doe not reflect light readily, in manufacturing the reinforce material.

As above pointed out, even though the layer of adhesive for anchoring the flock fibers be of but small depth, this layer of cured adhesive, as usually applied, forms a continuous skin adherent to the surface of the foam and thus does have an appreciable and undesirable effect in stiffening the material even though the foam to be of the closed-cell type.

Figure 10:
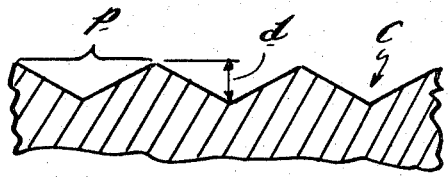
FIG. 10 is a fragmentary radial section through the roll of FIG. 9, but to very large scale.

In accordance with a preferred embodiment of the present invention, as above noted, this disadvantage is overcome, as about to be described, by so applying the adhesive as to form a discontinuous skin or layer whose discontinuity appreciably adds to the softness and drapeability of the completed material. Such a discontinuous layer is illustrated to a greatly enlarged scale in FIG. 10.

The adhesive is preferably applied by means of a rotary roll having a ribbed surface, the ribbed surface being constituted, for example, by a multiple screw thread of a pitch ($p$) of, for instance, 0.0345 inch and of a depth ($d$) of 0.008 inch, each thread being triangular in transverse section.

Figure 11:
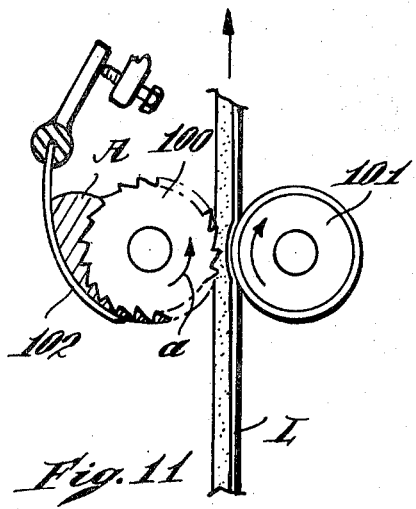
FIG. 11 is a fragmentary diagrammatic end elevation, showing apparatus, including the roll of FIG. 9, illustrative of its mode of use.
Figure 13:
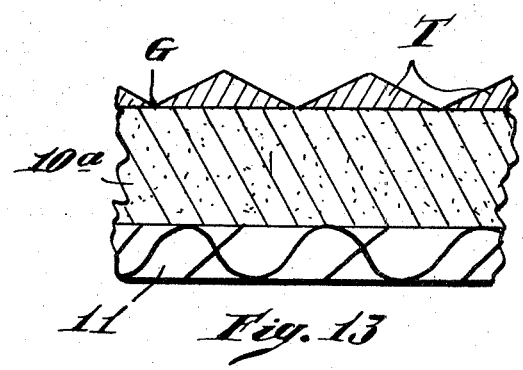
FIG. 13 is a fragmentary diagrammatic vertical section, to much greater scale, through a piece of the flocked material such as results from the practice of applying the adhesive by the use of a roll similar to that of FIG. 9.

As illustrated in FIG. 11, the roll 100 which is power-driven in the direction of the arrow A has associated therewith a roll 101 which is resiliently urged toward the roll 100 so as to squeeze the base fabric L, which is fed between the rolls, with the foam ply opposed to the roll 100 so as to squeeze the foam ply 10a against the roll 100. A body A of adhesive is maintained in the dihedral angle between the periphery of the roll 100 and a resilient blade 102 which so presses against the roll 100 that, as the latter approaches the compressed foam ply, substantially the only adhesive which it carries is that which is within the channels G of the roll. As the fabric emerges from between the rolls 100 and 101 the foam ply extends and in doing so, because of its spongy character, it picks up adhesive from the channels of the roll and carries it away. The result is that the layer of adhesive, as thus applied to the foam ply, consists of a plurality of strips T (FIG. 13) greatly exaggerated in size in FIG. 13 of substantially triangular transverse section, the base of the triangle contacting the foam ply 10 with little, if any, adhesive at the junction of the juxtaposed strips T. It is true that ordinary so-called "closed cell" polyurethane foam does have small, scattered, shallow, open-cells in its surface layer, and the action of the rolls 100 and 101 is to force some of the adhesive into some of these cells, but these cells are so small and shallow that this adhesive does not appreciably stiffen the foam, while the continuity of the adhesive layer is thus further broken. While theoretically there is a zero thickness of adhesive between adjacent strips T, the fluidity of the adhesive is such that there may be a film of adhesive along this line, but the fact that the layer of adhesive is almost, if not actually interrupted at these so frequent intervals, substantially nullifies any tendency of the cured adhesive to stiffen the foam ply, and to all intents and purposes, the material behaves substantially as though the adhesive layer consisted solely of completely independent, very narrow strips arranged side-by-side. It is with this understanding that the adhesive layer is herein referred to as "discontinuous."

The amount of adhesive applied by such a roll depends mainly upon the capacity of the channels to pick up adhesive. Thus, by providing rolls having channels of different depths or wherein the channels are spaced different distances apart, the amount of adhesive, per square yard of material, may be varied at will. A recommended arrangement, as the result of experiment, provides 28 channels per inch lengthwise of the roll, each of a depth of 0.008 inch, for example, and with the top edges of adjacent ribs 0.0345 inch apart. Further, as the result of experiment, it appears that not less than twenty-five channels per inch (lengthwise) of the roll should be provided and as many as forty per inch have proven to be satisfactory. It has also been found that channels of different depths, for example, from 0.011 inches to 0.004 inch, depending upon the adhesive employed, provide a surface layer of requisite thickness.

The flock fibers when applied to this kind of adhesive layer adhere to the strips T of adhesive, but these strips are so narrow and close together and the flock fibers so overhang the intersections of the strips that the appearance is substantially identical with that which would be seen were the adhesive of uniform depth over the entire surface.

Careful experiment has shown that this procedure does not detract from the surface appearance of the flock layer nor appreciably reduce the insulating characteristics of the material.

For the production of a high degree of ornamentation and an artistic and pleasing appearance, not heretofore found in blanket material, it is contemplated, in accordance with the present invention, that before the flock fibers (desirably white or uncolored) are applied to the adhesive coating on the foam layer (the adhesive, in this instance at least being transparent or translucent), the foam layer may be passed through printing or equivalent apparatus whereby any desired pattern (FIG. 7) including multicolored floral patterns, may be imprinted on the surface of the foam. These printed patterns, in such color or colors as may be desired, show through the flock layer (FIG. 8) after it has been applied, with a delicate, muted appearance, giving an effect which is more artistic and pleasing than anything in the blanket field heretofore known.

If, on the other hand, it be desired merely to give a uniform color to the blanket, a colored adhesive may be employed for uniting the flock to the plastic.

By applying coloring material to the surface of the foam and then so applying adhesive as to form an ornamental pattern while leaving other portions of the foam ply without adhesive, the flock will only stick to the areas constituting the pattern, and the areas devoid of adhesive will exhibit the color of the foam in full strength, while, at the flocked areas, the color is muted, and the areas of upstanding flock impart the impression to the observer that the fabric is embossed.

The adhesive may be applied by means of apparatus generally like that shown in FIG. 11, employing a roll R' (FIG. 14) having the desired pattern P in intaglio, so that the applied adhesive will have the ornamental pattern in cameo.

The application of flock will thus produce flock patterns standing up from the colored foam surface, giving the appearance of embossing.

It has heretofore been suggested that after the flock fibers have been applied and the adhesive cured, it is desirable to flex the material mechanically to soften it, but it has now been discovered that a more permanent softening of the material may be obtained by treating the foam with a vegetable oil, for specific example, coconut oil. This may be done as follows:

A dispersion of coconut oil and water in a proportion of approximately 7% coconut oil is prepared (preferably including a small quantity of a conventional rancidity inhibitor) and , before the adhesive and flock material have been applied, the material is wetted with this fluid, preferably by the use of a conventional padding apparatus, sufficient of the dispersion being applied so that after the material has been dried, as, for example, by passing it over customary drying cans, there remains in the dry material approximately 0.318 ounce of coconut oil per square yard. The base material, after this treatment, is coated with adhesive and before the adhesive has been cured the flock is applied as above described. When the adhesive has been cured, the oil is thereby confined and remains as a permanent constituent of the finished material. Material so prepared is soft and permanently drapeable, whereas, in accordance with the prior practice of beating the cured material to soften it, it has been found that it tends gradually to resume its initial stiffness during use. In order to prevent the completed material from becoming rancid it is desirable to add to the dispersion of oil and water a small amount of a commercial anti-rancidity material.

The material resultant from the practice of the present invention has a combination of charatceristics differentiating it from previous blanket materials; thus it is unusually light in weight; soft, very flexible, drapeable, not harmful to the skin; provides unusually high heat-insulation; dries very quickly after laundering; is dimensionally stable, that is, it does not shrink or deteriorate as a result of laundering; is almost completely non-shedding, that is, neither laundering nor long use causes appreciable loss of nap. It is very cheap to manufacture as compared with blankets made from woven spun yarns, since the labor cost in operating machinery which is used is of the order of $1/10$ that involved in the making of woven blankets, and its appearance and soft hand is more attractive than any previous blanket material (known to applicant) and it retains these characteritsics after many launderings. Moreover, its color does not change to a substantial degree when exposed to ultraviolet light.

I claim:
1. The method of preparing soft, limp, heat-insulating material comprising providing a laminate of a reinforcing sheet material having voids which constitute at least 75% of the unit area, to one side of which is permanently united a closed-cell polyurethane foam sheet material of an approximate thickness from $1/16$ to $3/32$ inch, providing an adhesive of a viscosity such that when applied to the exposed surface of said foam sheet material it will remain on said exposed surface without substantial spreading or penetration into said foam sheet to any substantial depth, depositing the adhesive on said exposed surface of the foam sheet, with a printing roll having a discontinuous surface, in the form of a discontinuous coating, providing flock fibers, and distributing said flock fibers evenly over said discontinuous adhesive coating before the adhesive sets.

2. A method according to claim 1, comprising depositing the adhesive on said exposed surface of the foam sheet with a printing roll having surface discontinuities in the form of peripherally spaced grooves and ribs to form on said foam surface a multitude of substantially independent closely adjacent parallel strips of adhesive interspersed with strips substantially bare of adhesive.

3. A method according to claim 1, comprising applying adhesive to said exposed surface of the foam sheet with said printing roll in an amount of from 0.9 to 1.5 ounces of adhesive per square yard.

4. A method comprising providing a laminate of two sheets of closed-cell polyurethane foam sheeting, said foam sheeting being bonded, respectively, to the opposite sides of said reinforcing sheet and being, respectively, approximately $1/16$ of an inch thick and $3/32$ of an inch thick, and applying said flock fibers to the exposed surface of each of said polyurethane foam sheets according to claim 1.

5. A method according to claim 2, comprising moving the exposed surface of the foam sheet while under compression in tangential engagement with the ribs of the printing roll, and supplying adhesive to the surface of the roll moving toward the place of tangency.

6. A method according to claim 5, comprising wiping the adhesive from the apices of the ribs, leaving the adhesive substantialy exclusively in the grooves between the ribs.

7. A method according to claim 1, further characterized in providing an adhesive for bonding the flock fibers to the exposed surface of the foam sheet which is free from metallic salt complex catalyst and which is of a viscosity such that it may be spread evenly over the exposed surface of the foam sheet and is sufficiently tacky when spread to insure adhesion of the flock fibers upon contact.

8. A method according to claim 1, further characterized in providing an adhesive which is free of acid salt complex or metallic salt complex catalysts, when applied has a viscosity in the order of 15±5 c.p.s. and a pH value of from 7.5 to 8.5 and is such that when cured it forms a transparent film and that to protect the foam ply from the action of ultraviolet light contains an ultraviolet absorber.

9. The method according to claim 1, further characterized in providing adhesive which comprises a base of a self-cross-linking acrylic emulsion having substantially the following physical properties, namely viscosity at 25° C., 200 c.p.s.; a density at 25° C. of 8.8 lbs. per gallon; a film break-elongation load of 620 p.s.i. and a film hardness of 32 Shore (A scale) but modifying the viscosity of the adhesive so provided by the addition of 1.2% of a thickener so that it will not penetrate substantially into the foam ply.

10. The method according to claim 1, further comprising providing an adhesive which, when applied as a liquid, has a viscosity of the order of 15±5 c.p.s. and contains a thermosetting resin which provides desired bonding strength, said resin being selected from a group comprising melamine formaldehyde concentrate and urea formaldehyde concentrated and being in a concentration of from 1.2 to 4.8% by weight of the basic adhesive.

11. The method according to claim 1, characterized in that in applying the flock fibers, relatively long fibers of substantially uniform length of from 3 to 6 mm. are first distributed relatively sparsely over the entire area of the foam-coated surface and thereafter, before the adhesive has set, distributing, relatively closely over the entire area of the foam-coated surface, shorter fibers of substantially uniform length of the order of 3/4 mm. in length and in quantity such as to fill the spaces between the long fibers.

12. An article of manufacture made according to the method of claim 1, comprising a reinforce ply of open-mesh textile fabric permanently bonded to a closed-cell polyurethane foam sheeting and flock fibers secured to the exposed surface of the foam sheeting in a discontinuous coating of cured adhesive, said flock fibers standing substantially perpendicular to the surface of the foam sheeting.

13. An article of manufacture according to claim 12, characterized in that the adhesive is dispersed so that there are discrete areas of adhesive interspersed with discrete areas substantially bare of adhesive.

14. An article of manufacture according to claim 12, characterized in that parallel grooves break the continuity of the adhesive coating, the grooves being of such width and so spaced that there are approximately 25 grooves per inch.

15. An article of manufacture according to claim 12, further characterized in that the reinforce ply of open-mesh textile fabric is interposed between and bonded permanently to each of two plies of closed-cell polyurethane foam of a thickness of from $1/16$ to $3/32$ of an inch, and the flock fibers are adhesively bonded to the exposed surface of each respective foam sheet.

16. An article according to claim 12, further characterized in that the adhesive contains an ultraviolet absorber such as substantially to prevent discoloration of the form when exposed to ultraviolet light.

17. An article according to claim 12, wherein the reinforcing ply of open-mesh textile fabric has been delustered to minimize the evidence of the presence of the reinforcing ply in the completed article.

18. An article according to claim 1, further characterized in that the exposed surface of the foam ply is overlain by upstanding flock fibers of two different lengths, the major portion of the flock fibers being of the shorter length and being uniformly and closely spaced and the longer fibers being less closely spaced and uniformly distributed among the shorter fibers, said long and short fibers covering the entire exposed surface of the foam ply and collectively imparting to the article the appearance and feel of conventional nap such as results from napping of woven blanket cloth.

19. An article of manufacture according to claim 12, further characterized in that the adhesive which bonds the flock fibers to the exposed surface of the foam layer is free of salt complex catalysts.

20. An article of manufacture according to claim 12, further characterized in that the adhesive which bonds the flock fibers to the exposed surface of the foam ply comprises from 0.2% to 1% of 2(2'-hydroxy-5'-methylphenyl) benzotriazone as the ultraviolet absorber.

References Cited

UNITED STATES PATENTS

| Re. 23,741 | 11/1953 | Summers | 161—63 XR |
|---|---|---|---|
| 2,014,947 | 9/1935 | McCulloch et al. | 117—33 XR |
| 2,901,373 | 8/1959 | Weiss | 117—9 |
| 3,215,584 | 11/1965 | McConnell et al. | 161—64 |
| 3,262,128 | 7/1966 | Morgan et al. | |

FOREIGN PATENTS 883,341    7/1953    Germany.

ROBERT F. BURNETT, Primary Examiner

R. H. CRISS, Assistant Examiner

U.S. Cl. X.R.

117—13, 14, 25, 33; 156—279; 161—64, 67, 89, 159